United States Patent [19]
Stöferle et al.

[11] 3,889,520
[45] June 17, 1975

[54] FLUIDIC SYSTEM FOR MONITORING MACHINE TOOL WEAR DURING A MACHINING OPERATION

[76] Inventors: Theodor Stöferle, Weinbergstrasse 29, D-6101, Seeheim; Bernhard Bellmann, Moselstrasse 7, D-6102, Pfungstadt, both of Germany

[22] Filed: Aug. 8, 1973

[21] Appl. No.: 386,783

[30] Foreign Application Priority Data
Feb. 13, 1973 Germany............................ 2307046

[52] U.S. Cl. ............................... 73/37.5; 73/104
[51] Int. Cl. ........................................ G01b 13/12
[58] Field of Search ................... 73/37.5, 37.6, 37.8; 33/DIG. 2

[56] References Cited
UNITED STATES PATENTS
3,446,058  5/1969  May ..................................... 73/37.5
3,577,642  5/1971  Tripoli et al. .................... 73/37.5 X

FOREIGN PATENTS OR APPLICATIONS
179,006  3/1966  U.S.S.R. .............................. 73/37.5

*Primary Examiner*—Richard C. Queisser
*Assistant Examiner*—Joseph W. Roskos
*Attorney, Agent, or Firm*—Watts, Hoffman, Fisher & Heinke

[57] ABSTRACT

A machine tool movable toward and away from a workpiece carries a nozzle for discharging fluid under pressure onto the workpiece. Changes in pressure of the discharging fluid are monitored as an indication of changes in the distance between the nozzle and the workpiece. The fluid is preferably directed onto machined workpiece portions just after they have come into engagement with the tool. The changes in pressure are monitored to provide a continuous indication of cutting tool wear. As the cutting tool wears away, the gap between the nozzle and the workpiece grows smaller causing a corresponding rise in pressure of the discharging fluid.

17 Claims, 4 Drawing Figures

FLUIDIC SYSTEM FOR MONITORING MACHINE TOOL WEAR DURING A MACHINING OPERATION

BACKGROUND OF THE INVENTION

1. Field of the Invention

The present invention relates generally to a novel and improved system for monitoring the wear of a machine tool during a machining operation.

2. Prior Art

Many proposals have been made for monitoring the wear of machine tools such as cutting tools during a cutting operation. If cutting tool wear can be monitored, optimum cutting conditions minimizing cutting time and cost can be selected and the cutting tool movement can be controlled to achieve optimum performance.

A highly accurate method of measuring cutting tool wear is to stop the cutting operation periodically and measure the tool wear directly. This discontinuous system has the obvious disadvantages of increasing cutting time and cost and providing no continuous indication of tool wear. In order to minimize machine down time, cutting tool wear is commonly measured directly only while the workpiece is being subjected to an operation not involving the particular cutting tool, or while workpieces are being changed.

A known system for continuous direct measurement of tool wear utilizes an electric micrometer with a feeler in engagement with the machined work surface. As tool wear increases the machined surface shifts relatively toward the tool, and this shift is sensed by the micrometer as a measurement of tool wear. This system is subject to a number of inherent disturbances that contribute to an inaccurate readout of tool wear, such as: (1) thermal expansion of the tool; (2) deflection of the tool due to cutting force; (3) deflection or vibration of the workpiece; (4) cutting tool inaccuracy; (5) irregularities in the machined surface contacted by the micrometer feeler; (6) the effect of cutting chips engaging the micrometer sensor. (7) influence of cutting temperature on micrometer feeler; and (8) fealer wear.

Electro-optical systems have also been proposed. One such system utilizes a vidicon tube to provide a greatly magnified view of the cutting edge. Another system uses a fiber optic bundle to transmit light reflected from the tool to a photometer. Such systems are susceptible to tool vibrations and other outside influences, and their outputs are not easily digitized to provide an accurate analysis of tool wear from one moment to the next.

Electro-mechanical systems have been proposed utilizing two electro-mechanical scanners. One scans the machined workpiece surface at a position remote from the cutting edge. The other scans a position on the tool near to the region of the engaged cutting edge. The change in distance between the cut surface and the tool is determined as a measure of cutting tool wear. This system is susceptible to external influences such as deformation of the tool by cutting force, temperature changes, or play in the machine parts. These external forces can operate singly or together to distort the signal representing cutting tool wear.

SUMMARY OF THE INVENTION

The present invention overcomes the foregoing and other drawbacks of the prior art and provides a novel and improved continuous system for monitoring cutting tool wear which is not affected by many of the external influences which distort the output signals of most known and proposed systems.

A continuously operating fluidic sensing system is provided. A nozzle is carried by the cutting tool for movement with the tool toward and away from workpieces. Fluid under pressure is supplied to the nozzle and discharges onto machined portions of the workpiece just after these portions have been engaged by the tool. Variating pressure within the fluid supply system is measured as an indication of a change in the gap dimension between the nozzle and the workpiece. As the cutting edge of the tool wears away, the gap diminishes causing a higher pressure in the fluid system.

The nozzle can be formed in the cutting tool itself, or can be a part of the tool support structure. Where the nozzle is formed in the cutting tool itself, it is preferably located near the cutting edge but spaced from it in the direction which machined workpiece portions move relative to the tool after being engaged by the tool. Such a location has the advantage that heat expansions and other variables which cause a change in distance between the cutting edge and the workpiece will not distort the signal. Moreover, the fluid measuring system itself provides additional cooling of the cutting tool and the workpiece.

Where the nozzle is a part of the cutting tool support structure, the nozzle is not subject to wear, and the expense of forming fluid passages in the hardened cutting tool is obviated. Whereas, the position of a nozzle formed in the cutting tool is not adjustable relative to the workpiece without a corresponding change in cutting tool position, a nozzle formed in or fixed to the tool support is easily adjusted without influencing cutting tool position.

One advantage of the system of the present invention is that sensing can take place in close proximity to the cutting edge. Another advantage is that the sensing system is that the spent measuring fluid tends to deflect shavings and other cooling fluid which would otherwise pass through the measuring area. Still another advantage is that no complex setting of the machine is necessary in changing tools in order to render the measuring system operable. Even when the area of measurement is relatively inaccessible, as for example in boring, milling, or reaming out an aperture with a boring rod, the measurement can be carried out undisturbed.

The problem of dimensional changes in the cutting tool due to thermal expansion is easily overcome by sensing temperature in or on the nozzle of the measuring system. A temperature feeler can be secured to the wall of the nozzle to provide a complete compensation for the influence of changing measuring fluid temperatures.

Still other advantages of the present invention are that it can be produced at relatively low cost and it will operate reliably even when subjected to relatively rough shop treatment. Since tool wear and breakage are automatically sensed, the requirement for machine monitoring personnel is substantially reduced.

A signal from the measuring device may also be used to control the rapid advance of the cutting tool toward the workpiece at the beginning of the finishing process. As the gap between the cutting edge and the workpiece is reduced, tool speed can be slowed automatically.

As will be apparent from the foregoing discussion, it is the general object of the present invention to provide an improved system for measuring cutting tool wear.

Other advantages and a fuller understanding of the invention may be had by referring to the following description and claims taken in conjunction with the accompanying drawings.

DESCRIPTION OF THE PREFERRED EMBODIMENT

Figure 1:
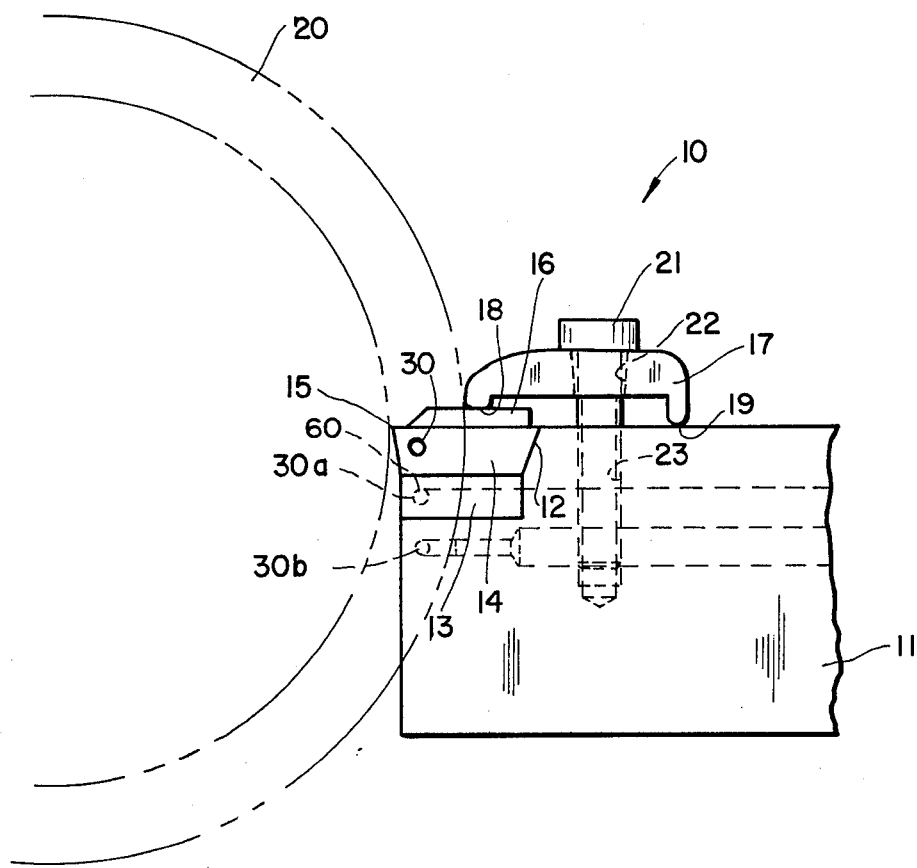
FIG. 1 is a schematic representation of a lathe tool engaging a workpiece with the tool and its support incorporating the tool wear monitoring system of the present invention.
Figure 2:
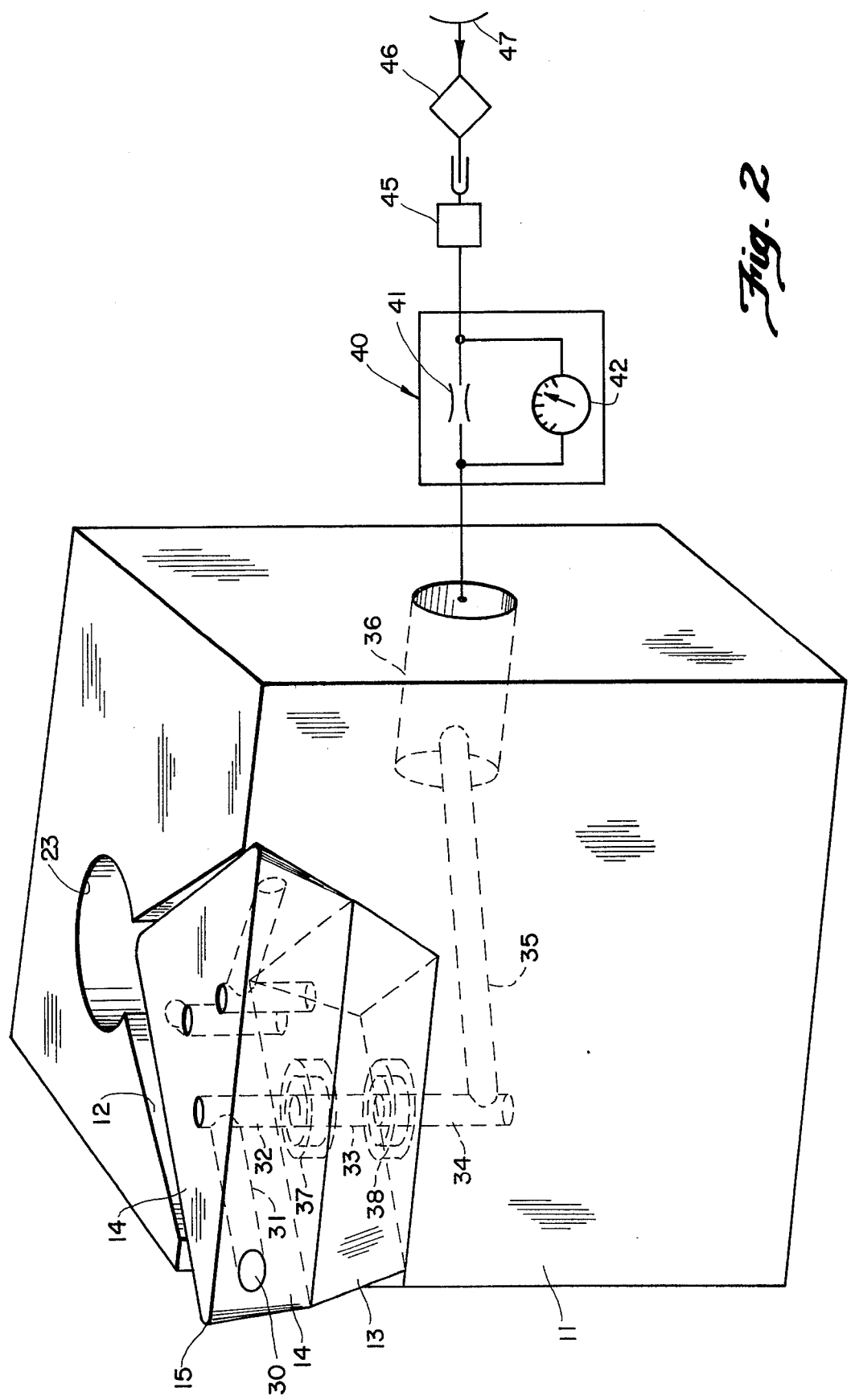
FIG. 2 is an enlarged perspective view of the lathe cutting tool of FIG. 1 with a tool clamping assembly removed and schematically including other elements of the tool wear monitoring system of the present invention.

Referring to FIGS. 1 and 2, a lathe cutting tool assembly is shown generally by the numeral 10. The assembly 10 includes an elongate tool support bar 11 of generally rectangular cross section. A notch 12 is formed in one end region of the support bar 11. A tool support plate 13 is positioned in the notch 12 to provide a rigid planar tool supporting base. A cutting tool 14 is positioned in the notch 12 in engagement with the support plate 13. A cutting tip or edge 15 is formed on the tool 14 for cutting engagement with a workpiece 20. A shaving breaker plate 16 is positioned atop the cutting tool 14.

A clamp assembly is provided to hold the cutting tool 14 securely in place on the bar 11. A clamping bracket 17 has depending end regions 18, 19 which engage the upper surfaces of the shaving breaker plate 16 and the support bar 11, respectively.

A threaded fastener 21 extends through an aperture 22 in the clamping bracket 17 and into a threaded aperture 23 in the support bar 11. The fastener 21 is tightened securely in place to clamp the shavings breaker plate 16, the tool 14, and the support plate 13 against the bottom surface of the notch 12.

In accordance with the present invention, the described conventional lathe cutting tool assembly is provided with a fluid system for measuring the wear of the tool cutting tip 15. A measuring nozzle 30 is formed in the cutting tool 14. The nozzle 30 opens through the relieved supporting surface of the cutting tool 14 at a position below the cutting tip 15.

A series of interconnecting passages are formed through the cutting tool 14, the support plate 13 and the support bar 11 to supply the nozzle 30 with a pressurized fluid. Referring to FIG. 2, a pair of intersecting right angle bores 31, 32 communicate the nozzle opening 30 with the bottom surface of the cutting tool 14. A through bore 33 is provided in the support plate 13 in alignment with the cutting tool bore 32. Intersecting bores 34, 35 formed in the support bar 11 communicate the support plate bore 33 with an enlarged conduit 36 which extends axially through the support bar 11.

Sealing rings 37, 38 are carried by the support plate 13 to provide a fluid tight connection between the bores 32, 33, 34. The sealing rings are formed from a material having a heat expansion coefficient which is greater than that of the metals which form the support bar 11, the support plate 13, and the cutting tool 14. Once such material is TEFLON plastic.

A differential pressure measuring device of conventional design is indicated generally by the numeral 40. The pressure measuring device 40 typically includes a restricted flow Venturi device 41 and a pressure gauge 42 which senses differential pressure across the Venturi device 41.

The pressure sensing device 40 is interposed in the fluid supply line which supplies fluid under pressure to the conduit 36. Upstream from the pressure sensing device 40 is a pressure regulator 45 of convention design, together with a fluid filtering device 46. Pressurized fluid from a source 47 is transmitted sequentially through the filtering device 46, the pressure regulator 45, and the pressure sensing device 40 to the conduit 36 where it is transmitted through the bores 31–35 to the nozzle opening 30.

Figure 3:
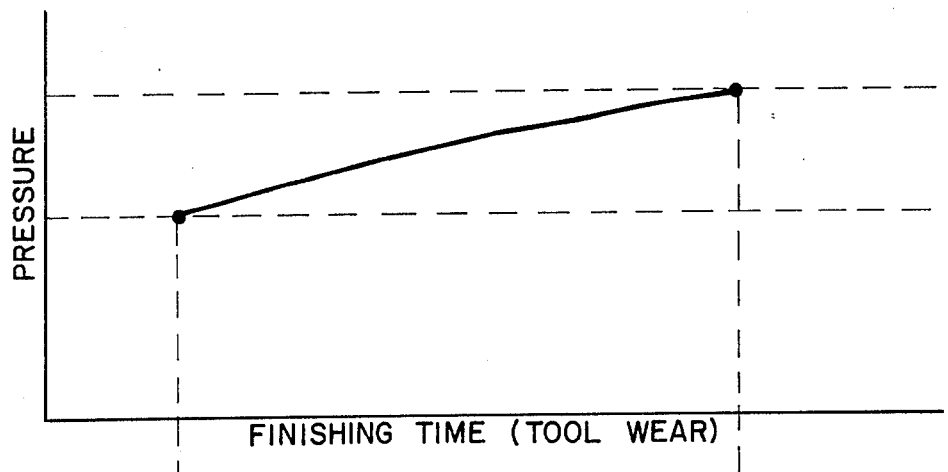
FIG. 3 is a pressure curve diagram illustrating the pressure in the measuring nozzle as a function of finishing time; and, FIG. 4 is a top plan view on an enlarged scale of a lathe cutting tool tip incorporating the measuring system of the present invention.
Figure 3:
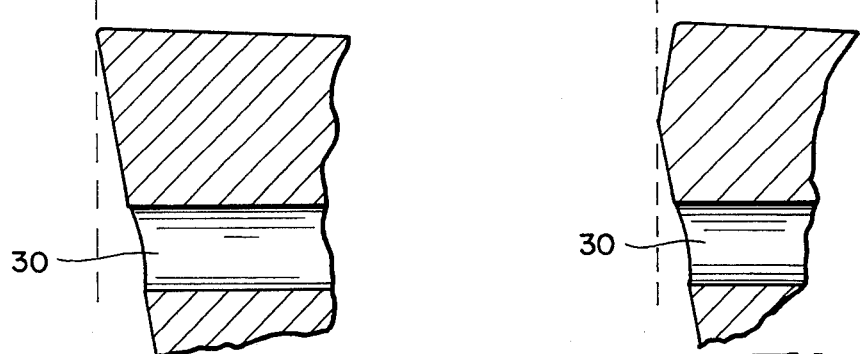

The pressure differential measured by gauge 42 varies as a function of the width of the gap between the cutting tool 14 and the workpiece 20. As is illustrated in FIG. 3, with increased wear on the cutting edge of the tool the gap between the tool and the workpiece 20 decrease causing a corresponding increase in nozzle pressure.

In order to enable all three corners of the cutting tool 14 to be used in succession, alternate nozzle openings 30', 30'' are provided as shown in FIG. 2. Separate intersecting bores 31', 32' and 31'', 32'' are provided for the alternate nozzle openings 30', 30'' so that only one of the bores 32, 32', 32'' is in communication with the bore 33 at any one time.

Two alternate arrangements of sensing nozzle openings 30a, 30b, are illustrated in FIG. 1. The openings 30a, 30b are formed respectively in the supporting plate 13 and the support bar 11. While it is desirable to locate the nozzle opening in close proximity to the cutting edge 15, there are applications wherein the configuration of the cutting tool does not readily permit the formation of a nozzle opening or communicating passages therein and such alternate nozzle locations as 30a, 30b can be used.

Figure 4:
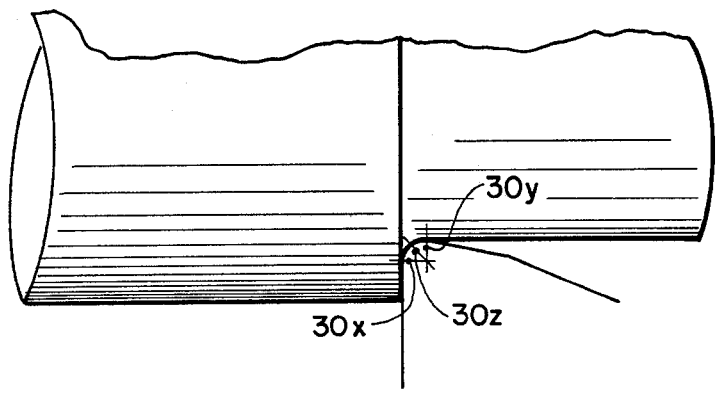

In roughing tools, the nozzle opening is preferably set perpendicular to the cut surface as indicated at 30x in FIG. 4. In smoothing tools, the nozzle opening should be perpendicular to the axis of the workpiece, as indicated at 30y in FIG. 4. The position of the nozzle shown at 30z in FIG. 4 serves for determination of the wear on corner roundings.

A thermocouple can be located in the nozzle opening in use, as shown at 60 in FIG. 1 to measure the nozzle temperature. The output from the thermocouple can be feed in a conventional manner to apparatus for temperature compensation, thereby compensating for the influence of temperature fluctuations on the sensed pressure changes.

The preferred gaseous measuring medium is air. Other gases for example, an inert gas can also be used. In some instances, it is advantageous to use a liqiud as the measuring medium. Typical liquids which have been used with success are water, oil, and a water and oil emulsion. The liquids can be used to serve a cooling function to keep the tool and the workpiece cool by virtue of their flow. To largely exclude the influence of viscosity/temperature changes, a fluid is preferably selected which has a substantially constant viscosity throughout a wide range of temperatures occurring in the finishing operation. Liquid sensing mediums have been found to provide an increased sensitivity of measurement over gaseous mediums.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. In a machining apparatus of the type including machine tool operable to perform a machining operation on a workpiece, the improvement of a system for monitoring relative movement of the tool toward and away from the workpiece, comprising:
  a. a fluid supply system including:
    i. a fluid nozzle formed in the tool for movement therewith relatively toward and away from the workpiece;
    ii. conduit means communicating with said nozzle and adapted for connection to a source of pressurized fluid for supplying fluid under pressure to said nozzle; and,
  b. pressure monitoring means communicating with said fluid supply system for sensing changes in fluid pressure as an indication in changes in the distance between said nozzle and the workpiece.

2. The apparatus of claim 1 wherein:
  a. a tool support structure is provided for supporting the machine tool and for moving the machine tool toward and away from the workpiece; and
  b. communicating portions of said conduit means are formed in said machine tool and in said tool support.

3. The apparatus of claim 2 wherein a sealing ring is provided to seal the juncture between said communicating portions in said tool and said tool support.

4. The apparatus of claim 3 wherein said sealing ring is formed of a material having a coefficient of heat expansion greater than that of the materials from which the surrounding tool and tool support portions are formed.

5. In a machining apparatus of the type including a tool support and a machine tool positionable thereon one at a time in a plurality of attitudes to selectively present a plurality of machining surfaces one at a time for a machining operation on a workpiece, the improvement of a system for monitoring movement of the tool toward and away from a workpiece, comprising:
  a. a fluid supply system including:
    i. a plurality of nozzles formed in said tool, each of said nozzles being associated with a separate one of said machining surfaces and being adapted to direct fluid under pressure onto a workpiece;
    ii. a plurality of fluid passages formed in said tool, each of said passages having a separate inlet and an outlet communicating with a separate one of said nozzles;
    iii. conduit means adapted for connection to a source of fluid under pressure and selectively connectable one at a time to said inlets to effect the discharge of fluid under pressure through a selected nozzle and onto a workpiece; and,
  b. pressure monitoring means communicating with said fluid supply system for sensing changes the pressure of fluid discharged through said selected nozzle as an indication of changes in distance between said selected nozzle and the workpiece.

6. The apparatus of claim 5 wherein said conduit means includes a fluid conduit formed in said tool support, and said inlets are arranged to communicate one at a time with said fluid conduit as different ones of said machining surfaces are positioned for a machining operation, whereby orienting said tool on said tool support to position a selected machining surface for a machining operation will simultaneously communicate the associated fluid nozzle with said fluid conduit.

7. In a machining apparatus of the type including a machine tool operable to perform a machining operation on a workpiece and a tool support structure for moving the machine tool toward and away from the workpiece, the improvement of a system for monitoring relative movement of the tool toward and away from the workpiece, comprising:
  a. a fluid supply system including:
    i. a fluid nozzle formed in the tool support structure at a position near the tool for movement therewith toward and away from the workpiece;
    ii. conduit means communicating with said nozzle and adapted for connection to a source of pressurized fluid for supplying fluid under pressure to said nozzle, portions of said conduit means being formed in the tool support structure; and,
  b. pressure monitoring means communicating with said fluid supply system for sensing changes in fluid pressure as an indication in changes in the distance between said nozzle and the workpiece.

8. In a machining apparatus of the type including a machine tool operable to perform a machining operation on portions of a workpiece which engage the tool and move relative thereto along a predetermined path of movement, the improvement of a system for monitoring relative movement of the tool toward and away from the workpiece, comprising:
  a. a fluid supply system including:
    i. a fluid nozzle formed in the tool for movement therewith relatively toward and away from the workpiece, said nozzle being positioned to discharge fluid onto machined workpiece portions traveling along such path of movement from engagement with the tool;
    ii. conduit means communicating with said nozzle and adapted for connection to a source of pressurized fluid for supplying fluid under pressure to said nozzle; and,
  b. pressure monitoring means communicating with said fluid supply system for sensing changes in fluid pressure as an indication in changes in the distance between said nozzle and the workpiece.

9. In a machine apparatus of the type including a machine tool operable to perform a machining operation on portions of a workpiece which engage the tool and move relative thereto along a predetermined path of movement, and a tool support structure supporting the tool for movement toward and away from the workpiece, the improvement of a system for monitoring relative movement of the tool toward and away from the workpiece, comprising:
 a. a fluid supply system including:
  i. a fluid nozzle formed in the tool support structure for movement therewith relatively toward and away from the workpiece, said nozzle being positioned to discharge fluid onto machined workpiece portions traveling along such path of movement from engagement with the tool;
  ii. conduit means communicating with said nozzle and adapted for connection to a source of pressurized fluid for supplying fluid under pressure to said nozzle, said conduit means having portions formed in the tool support structure; and,
 b. pressure monitoring means communicating with said fluid supply system for sensing changes in fluid pressure as an indication in changes in the distance between said nozzle and the workpiece.

10. In an apparatus including a cutting tool operable to engage a workpiece and to perform a machining operation on workpiece portions which engage the tool and move relative thereto along a predetermined path of movement, the improvement of a system for monitoring cutting tool wear during the machining operation, comprising:
 a. a fluid nozzle coupled to the cutting tool for movement therewith toward and away from the workpiece, said nozzle being positioned to discharge fluid under pressure onto machined workpiece portions traveling along said path from engagement with the tool;
 b. fluid supply means communicating with said nozzle and adapted for connection to a source of pressurized fluid for supplying fluid under pressure to said nozzle; and
 c. pressure monitoring means for sensing changes in the pressure of the fluid discharging through said nozzle as an indication of changes in the distance between said nozzle and the workpiece whereby an indication of tool wear is provided during the machining operation.

11. The apparatus of claim 10 additionally including a tool support structure for moving the tool relatively toward and away from said workpiece, said nozzle and portions of said conduit means being formed within said tool support structure.

12. A method of continuously monitoring cutting tool wear while a cutting tool is in engagement with a workpiece, comprising the steps of:
 a. positioning a cutting tool in engagement with a workpiece and effecting relative movement of the workpiece and the tool to perform a machining operation on the workpiece;
 b. providing a fluid nozzle formed in the cutting tool;
 c. discharging fluid under pressure through said nozzle and into engagement with machined portions of said workpiece; and,
 d. monitoring the pressure of the fluid supplied to said nozzle to provide an output signal which varies dependent on changes in the distance between said nozzle and said workpiece, whereby said output signal is representative of cutting tool wear.

13. A method of continuously monitoring cutting tool wear while a cutting tool is in engagement with a workpiece, comprising the steps of:
 a. supporting a cutting tool on a tool support for movement relative to a workpiece;
 b. positioning the cutting tool in engagement with a workpiece and effecting relative movement of the workpiece and the tool to perform a machining operation on the workpiece;
 c. providing a fluid nozzle formed in the tool support;
 d. discharging fluid under pressure through said nozzle and into engagement with machined portions of said workpiece; and,
 e. monitoring the pressure of the fluid supplied to said nozzle to provide an output signal which varies dependent on changes in the distance between said nozzle and said workpiece, whereby said output signal is representative of cutting tool wear.

14. In an apparatus including a cutting tool having a main cutting edge portion which is operable to engage a workpiece and to perform a machining operation on workpiece portions which engage the tool and move relative thereto along a predetermined path of movement, the improvement of a system for monitoring wear of the main cutting edge portion during the machining operation, comprising:
 a. a fluid nozzle formed within the cutting tool for movement therewith toward and away from the workpiece, said nozzle being positioned to discharge fluid under pressure onto machined workpiece portions traveling along said path from engagement with the main cutting edge portion of the tool;
 b. fluid supply means communicating with said nozzle and adapted for connection to a source of pressurized fluid for supplying fluid under pressure to said nozzle; and,
 c. pressure monitoring means for sensing changes in the pressure of the fluid discharging through said nozzle as a indication of changes in the distance between said nozzle and the workpiece portions which have been engaged by the main cutting edge portion whereby an indication of wear of the main cutting edge portion is provided during the machining operation.

15. In an apparatus including a cutting tool having main cutting edge portion which is operable to engage a workpiece and to perform a machining operation on workpiece portions which engage the tool and move relative thereto along a predetermined path of movement, the improvement of a system for monitoring wear of the main cutting edge portion during the machining operation, comprising:
 a. a fluid nozzle coupled to the cutting tool for movement therewith toward and away from the workpiece, said nozzle being positioned to discharge fluid under pressure onto machined workpiece portions traveling along said path from engagement with the main cutting edge portion of the tool;
 b. fluid supply means communicating with said nozzle and adapted for connection to a source of pressurized fluid for supplying fluid under pressure to said nozzle;
 c. pressure monitoring means for sensing changes in the pressure of the fluid discharging through said nozzle as an indication of changes in the distance between said nozzle and the workpiece portions which have been engaged by the main cutting edge portion whereby an indication of wear of the main cutting edge portion is provided during the machining operation; and, d. a tool support structure for moving the tool relatively toward and away from said workpiece, said nozzle and portions of said conduit means being formed within said tool support structure.

16. A method of continuously monitoring wear of the main cutting edge portion of a cutting tool while the cutting tool is in engagement with a workpiece, comprising the steps of:

a. positioning a cutting tool with its main cutting edge portion in engagement with a workpiece and effecting relative movement of the workpiece and the tool to perform a machining operation on the workpiece;

b. forming a fluid nozzle and a communicating fluid conduit within the cutting tool for movement therewith to the workpiece;

c. discharging fluid under pressure through said nozzle and into engagement with portions of said workpiece which have been machined by the main cutting edge portion of the tool; and, d. monitoring the pressure of the fluid supplied to said nozzle to provide an output signal which varies dependent on changes in the distance between said nozzle and workpiece portions which have been machined by the main cutting edge portion, whereby said output signal is representative of wear of the main cutting edge portion.

17. A method of continuously monitoring wear of the main cutting edge portion of a cutting tool while the cutting tool is in engagement with a workpiece, comprising the steps of:

a. positioning a cutting tool with its main cutting edge portion in engagement with a workpiece and effecting relative movement of the workpiece and the tool to perform a machining operation on the workpiece;

b. forming a fluid nozzle in a tool support structure used to position the cutting tool relative to the workpiece;

c. discharging fluid under pressure through said nozzle and into engagement with portions of said workpiece which have been machined by the main cutting edge portion of the tool; and, d. monitoring the pressure of the fluid supplied to said nozzle to provide an output signal which varies dependent on changes in the distance between said nozzle and workpiece portions which have been machined by the main cutting edge portion, whereby said output signal is representative of wear of the main cutting edge portion.

* * * * *